United States Patent [19]
MacDonald

[11] Patent Number: 6,044,430
[45] Date of Patent: Mar. 28, 2000

[54] REAL TIME INTERRUPT HANDLING FOR SUPERSCALAR PROCESSORS

[75] Inventor: James R. MacDonald, Buda, Tex.

[73] Assignee: Advanced Micro Devices Inc., Sunnyvale, Calif.

[21] Appl. No.: 08/992,283

[22] Filed: Dec. 17, 1997

[51] Int. Cl.[7] ............................................. G06F 9/46
[52] U.S. Cl. .................................. 710/260; 711/133
[58] Field of Search ...................... 710/260–269; 711/133

[56] References Cited

U.S. PATENT DOCUMENTS

| | | | |
|---|---|---|---|
| 3,017,092 | 1/1962 | Rent et al. ............................. | 710/260 |
| 4,463,420 | 7/1984 | Fletcher ................................ | 711/133 |
| 4,709,324 | 11/1987 | Kloker ................................. | 712/207 |
| 4,796,223 | 1/1989 | Sugita et al. ........................ | 360/69 |
| 5,353,425 | 10/1994 | Malamy et al. . | |
| 5,365,476 | 11/1994 | Mukhanov ........................ | 365/162 |
| 5,487,162 | 1/1996 | Tanaka et al. . | |
| 5,631,952 | 5/1997 | O'Barr et al. ..................... | 379/93.01 |
| 5,638,537 | 6/1997 | Yamada et al. . | |
| 5,644,755 | 7/1997 | Wooten ............................ | 395/500 |
| 5,659,760 | 8/1997 | Enami ............................... | 710/269 |
| 5,748,970 | 5/1998 | Miyaji et al. ..................... | 710/260 |
| 5,802,574 | 9/1998 | Atallah et al. .................... | 711/144 |
| 5,913,224 | 6/1999 | MacDonald . | |

OTHER PUBLICATIONS

Pentium™ Processor User's Manual, vol. 3, Architecture and Programming Manual, published by Intel Corporation, 1993, Chapter 20: System Management Mode, pp. 20–1 to 20–9.

*Primary Examiner*—Paul R. Myers
*Attorney, Agent, or Firm*—Conley, Rose & Tayon, P.C.; Lawrence J. Merkel; B. Noel Kivlin

[57] ABSTRACT

A CPU includes a real time interrupt (RTI) control unit configured to control real time interrupt capabilities of the CPU. Upon receipt of a real time interrupt signal via an RTI pin, the RTI control unit interrupts the currently executing instructions at an instruction boundary in order to execute the interrupt service routine. Instead of using the interrupt acknowledge cycles normally used to locate an interrupt vector, and then using the interrupt vector to locate an interrupt descriptor, the interrupt descriptor is stored in an RTI register coupled to the RTI control unit. In one embodiment, the CPU is configured not to save processor context upon initiation of a real time interrupt. Instead, as register resources are needed by the real time service routine, these resources are allocated. Registers allocated for real time use are indicated in the RTI register. In yet another embodiment, the CPU is configured with lockable cache lines in the instruction and data caches. An RTI bit is defined in the code and data segment descriptors for indicating whether or not the code/data within the segment is real time code/data (i.e. is used in an RTI service routine). The code/data within these segments is locked into the instruction and/or data cache. The cache replacement algorithm employed by the cache attempts to select a non-locked cache line for storing a cache line being transferred into the cache.

11 Claims, 4 Drawing Sheets

REAL TIME INTERRUPT HANDLING FOR SUPERSCALAR PROCESSORS

BACKGROUND OF THE INVENTION

1. Field of the Invention

The present invention is related to the field of microprocessors and, more particularly, to the interrupt handling mechanisms within microprocessors.

2. Description of the Relevant Art

Modern computer systems and the software which runs thereon demand a high performance interrupt structure in order to operate efficiently. Interrupts are used to switch between tasks, and so a multi-tasking operating system benefits from a high performance interrupt structure. A "multi-tasking" operating system is configured to run multiple programs concurrently. Additionally, interrupts provide a means for an electronic device external to the microprocessor to request attention from the operating system. Modern day computer systems are including increasing numbers of these electronic devices, prompting the need for a high performance interrupt structure.

Interrupts cause a microprocessor within the computer system to suspend execution of a task in order to execute a specific software routine (referred to as an interrupt service routine) comprising a set of instructions. The interrupt is typically unrelated to the instructions being executed by the microprocessor at the time the interrupt is signalled. Instead, the interrupt may be caused by an external device requiring software attention. For example, a buffer within an input/output device may fill with data to be transferred to another device or to memory. Many other sources for interrupts are well-known to the skilled artisan.

The instructions being executed by the microprocessor at the time the interrupt occurs are referred to herein as a "task". A task may be a portion of a program, an operating system routine, or even another interrupt service routine.

Because the interrupt is normally unrelated to the task being performed by the microprocessor and is asynchronous to the task itself, the interrupt service routine is executed in such a way that the task may be resumed. In order to resume the task, the "context" within which the task is executing may be saved to memory. The context of a task is the state of the microprocessor at a particular moment of time in which the task is executing. The context may include register values associated with the task when the task is interrupted. In other embodiments, context may be defined to include other values as well. When the context is saved, the register portion of the context may be saved to memory. After saving the context, the interrupt service routine may be executed. Upon completion of the interrupt service routine, the context may be restored to the microprocessor and the task is resumed. Since the restored context is substantially identical to the context when the task was interrupted, the task executes normally. In other words, the interrupt had no affect on the result of executing the task if the task is unrelated to the interrupt. Instead, only the time required to execute the task is affected.

The x86 architecture defines the context of 32 bit microprocessors to be 104 bytes. Other microprocessor architectures may define contexts having more or fewer bytes. Additionally, when the segment registers (which are part of the context in the x86 architecture) are reloaded, segment reloads are initiated to translate the segments. More bytes are transferred when the reload occurs, and clock cycles are required to translate the extra bytes into a format for storing within the microprocessor.

Unfortunately, storing and retrieving a large number of bytes to and from memory (as a context save entails) often requires a relatively large number of clock cycles. A clock cycle refers to the amount of time required by portions of the microprocessor to perform their functions. At the end of the clock cycle, the results of each function are stored in a storage location (e.g. a register or memory) and may be used by another function in the next clock cycle. The bus used by a microprocessor to communicate with other electrical devices may operate according to a different clock cycle than the microprocessor itself The clock cycle associated with the bus is often referred to as the bus clock cycle.

If the context is saved by the microprocessor when an interrupt is recognized by the microprocessor, the interrupt is being handled via a "task switch". The interrupt service routine is isolated from the interrupted task such that any modifications the interrupt service routine performs to the microprocessor's context information will not affect the operation of the task when resumed. The context is restored prior to resuming the task. Often, an interrupt service routine will only require access to a few registers within the register set to perform its function. In this case, a full context save is not necessary since some registers will not be modified by the interrupt service routine. Instead, only those storage locations which must be changed in order to fetch the instructions within the interrupt service routine need be saved prior to beginning execution of the interrupt service routine. For example, in the x86 architecture the EIP register and CS segment register (which define the address and segment of the instructions to be fetched and executed) and the flags register (which is modified by many of the x86 instructions) are saved. These values are pushed onto the stack defined by the x86 architecture when not using the task switch method of interrupt handling.

When the task switch method of interrupt handling is not in use, an interrupt service routine must save the values stored within registers which it employs to carry out its intended function. Often, the values are stored on the stack. This method of interrupt handling is referred to as an interrupt gate or trap gate in the x86 architecture, depending on whether or not the interrupt service routine may itself be interrupted. If the interrupt service routine does not use all of the microprocessor's context, then clock cycles may be saved with respect to performing the full context save of a task switch. The interrupt service routine is entered and exited more rapidly since context save and restore is not performed. Unfortunately, at least a few registers must still be stored. Additionally, the interrupt service routines are lengthened by the number of instructions required to save and restore context values used by the interrupt service routines. Furthermore, an administrative burden is placed on the programmer of the interrupt service routine to update the save and restore portions of the routine when the routine is changed.

Since there are multiple sources of interrupts, the computer system provides a mechanism for identifying one of multiple interrupt service routines. The computer system thus provides flexibility to the programmer in that an interrupt service routine may be tailored to the needs of a particular device or interrupt source. Without the interrupt vector approach, all interrupts would fetch an interrupt service routine from the same address in memory. A relatively complicated routine stored at the address would need to be written to perform the handling of all types of interrupts from all electronic devices. As used herein, the term "fetching" refers to transferring the contents of a memory location to a destination.

One method for providing the address of the interrupt service routine for a given interrupt is for the microprocessor to request an interrupt vector from another electronic device in the system. An "interrupt vector" is a number which is indicative of a particular interrupt service routine. In the x86 microprocessor architecture, for example, the interrupt vector is an index into an interrupt vector table which provides information identifying the address of the associated interrupt service routine. The interrupt vector table is also referred to as an interrupt descriptor table.

In many computer systems, the interrupt vector is provided via a dedicated bus transaction. A "bus transaction" is a transfer of information across a bus. Bus transactions may include address and data information as well as the type of transfer. Bus transactions may be address-only, in which an address and related control information are broadcast; data-only, in which data and related control information are broadcast; or address-data in which both address and data are involved. As referred to herein, a bus transaction dedicated for interrupt processing is an interrupt acknowledge bus transaction. Typically, an interrupt acknowledge bus transaction is performed by the microprocessor to acknowledge the existence of an interrupt condition and then a second interrupt acknowledge bus transaction is performed to collect the interrupt vector. Unfortunately, many clock cycles are used to perform the two interrupt acknowledge bus transactions. Until the interrupt vector is known, the computer system may not begin fetching the interrupt service routine.

Current interrupt structures (as described above) require a large number of clock cycles to execute. Clock cycles are used to save and restore a task's context (either within the interrupt routine or prior to fetching it), to fetch the interrupt vector, and to execute the interrupt service routine. With the advent of increasingly prevalent applications, such as multimedia applications, which require real time servicing, a method of servicing a particular class of interrupts in a more time efficient manner is desired.

SUMMARY OF THE INVENTION

The problems outlined above are in large part solved by a CPU in accordance with the present invention. The CPU includes a real time interrupt (RTI) control unit configured to control real time interrupt capabilities of the CPU. More particularly, upon receipt of a real time interrupt signal via an RTI pin, the RTI control unit interrupts the currently executing instructions at an instruction boundary in order to execute the interrupt service routine. Instead of using the interrupt acknowledge cycles normally used to locate an interrupt vector, and then using the interrupt vector to locate an interrupt descriptor, the interrupt descriptor is stored in an RTI register coupled to the RTI control unit. Advantageously, the interrupt descriptor is immediately available to the RTI control unit. The RTI control unit may thereby rapidly determine the fetch address for the RTI service routine. Interrupt latency for real time interrupts may thereby be reduced.

In one embodiment, the CPU is configured not to save processor context upon initiation of a real time interrupt. Instead, as register resources are needed by the real time service routine, these resources are allocated. Registers allocated for real time use are indicated in the RTI register. In this manner, the latency associated with the context save may be avoided. The allocated registers may be explicitly allocated as needed and deallocated (or released) when the register is no longer needed by the RTI service routine.

In yet another embodiment, the CPU is configured with lockable cache lines in the instruction and data caches. An RTI bit is defined in the code and data segment descriptors for indicating whether or not the code/data within the segment is real time code/data (i.e. is used in an RTI service routine). The code/data within these segments is locked into the instruction and/or data cache. The cache replacement algorithm employed by the cache attempts to select a non-locked cache line for storing a cache line being transferred into the cache. A locked cache line (storing real time code/data) may be selected if another locked cache line is being loaded, or if each selectable cache line is locked and the cache line being loaded is not a locked cache line (not storing real time code/data). Accordingly, real time code and/or data may be loaded into the caches prior to execution of any RTI service routines, and the code/data may be found therein when the RTI service routine is invoked. Advantageously, real time code/data may be available in the lowest latency memory, further decreasing the latency of RTI service routines.

Broadly speaking, the present invention contemplates, a microprocessor comprising a dedicated RTI pin, an RTI register, and an RTI control unit. The RTI register includes a selector field indicative of an address of an RTI service routine. Connected to the RTI pin and to the RTI register, the RTI control unit is configured to detect an RTI signal on the RTI pin and is further configured to cause the microprocessor to suspend execution of a currently executing task and to execute the RTI service routine in response to detecting the RTI signal. The microprocessor is adapted to execute the RTI service routine in response to receiving the RTI signal by transferring program execution to the address indicated by the selector field of the RTI register without requiring an acknowledge cycle.

The present invention further contemplates a method of handling interrupts in a computing system including a microprocessor. An RTI interrupt is initiated and routed to a dedicated RTI pin of the microprocessor. An RTI selector field within an RTI register of the microprocessor is read in response to receiving the RTI on the RTI pin. The selector field is indicative of an address of an RTI service routine. Execution of a currently executing task is suspended and execution of the RTI service routine is initiated without requiring the microprocessor to send an acknowledge signal.

BRIEF DESCRIPTION OF THE DRAWINGS

Other objects and advantages of the invention will become apparent upon reading the following detailed description and upon reference to the accompanying drawings in which.

Figure 1:
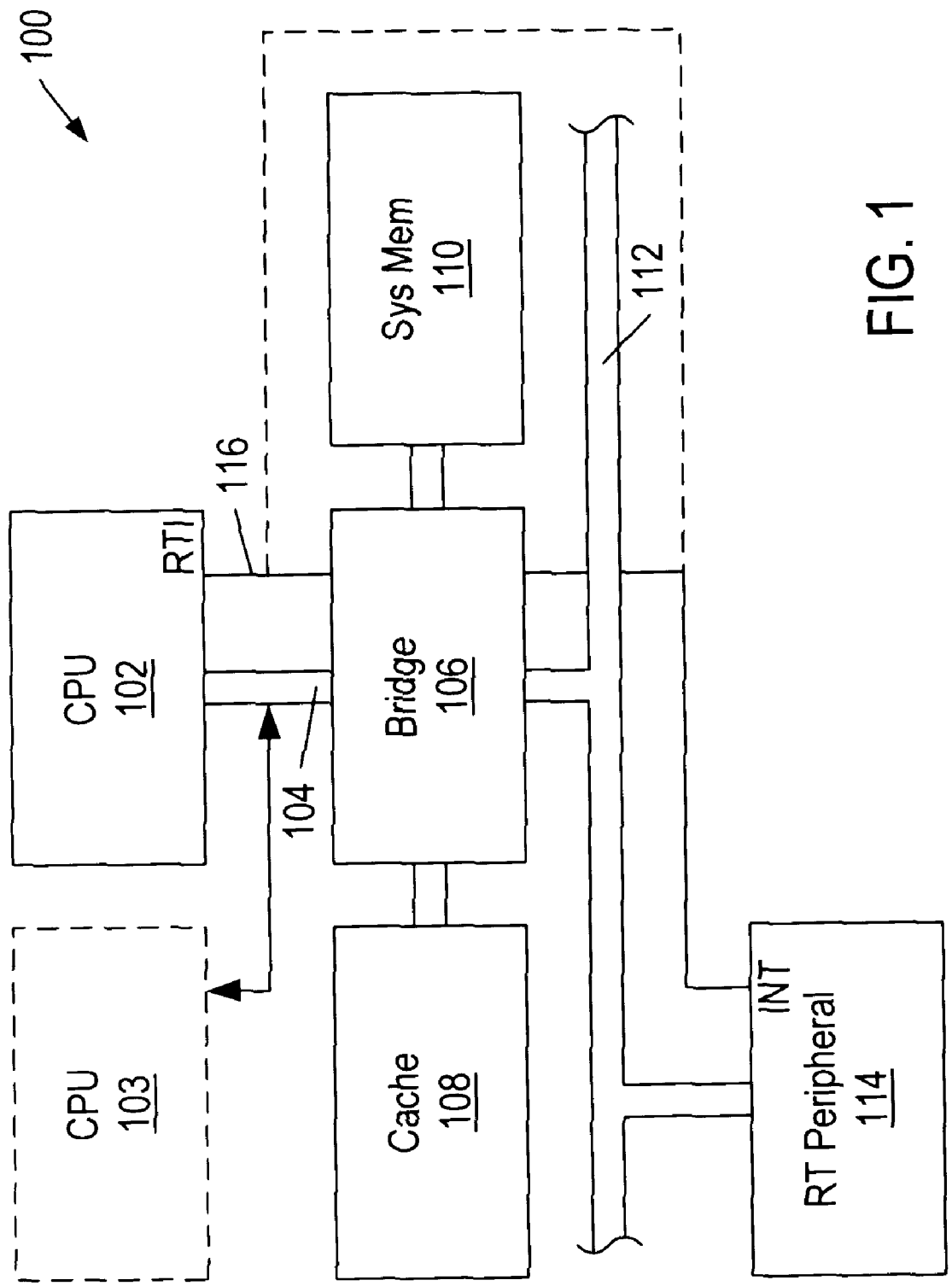
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a computer system 100 is shown. Other embodiments are possible and contemplated. As shown in FIG. 1, computer system 100 includes a central processing unit (CPU) 102, a bus bridge 106, a cache 108, a system memory 110, and a real time (RT) peripheral 114. CPU 102 is connected to bus bridge 106 via a CPU bus 104. Cache 108 and system memory 110 are connected via communications paths to bus bridge 106 as well. RT peripheral 114 is connected to bus bridge 106 via a peripheral bus 112. Additionally, RT peripheral 114 is connected to a real time interrupt line 116. Real time interrupt line 116 may be directly coupled to a real time interrupt (RTI) pin on CPU 102, or may be routed through an interrupt controller to CPU 102. For example the interrupt controller may be within bus bridge 106.

Generally speaking, when RT peripheral 114 detects a condition which causes an interrupt of CPU 102 in order to execute a real time interrupt service routine, RT peripheral 114 asserts an RTI signal upon RTI line 116. CPU 102 interrupts current program execution to vector to the requested interrupt service routine. RT peripheral 114 is illustrative of any real time device. For example, multimedia cards such as audio and video cards may be examples of real time devices. Generally, a real time device is a device which provides or requires data according to a sample interval from an external process (e.g. audio or video). For proper operation to occur, processing time within the device cannot exceed the sample interval. For example, if an MPEG video/audio stream is being played via RT peripheral 114, improper operation (e.g. video and audio playback which is jittery) may occur if the real time requirements are not met. Another example of RT peripheral 114 may be a data acquisition card used to record data measured from a device external from computer system 100. The data may be required at a certain sample rate measured in real time, as opposed to clock cycles by which communication is generally accomplished within computer system 100.

In order to meet real time requirements, it is generally desirable to provide a minimal response time to real time interrupts. Additionally, the minimal response time is preferably guaranteed even in the face of other traffic on CPU bus 104 and peripheral bus 112. CPU 102 employs several features to improve response time to real time interrupts, as described in more detail below.

CPU 102 communicates with bridge 106 via CPU bus 104 to initiate memory transactions to transfer data to and from system memory 110. System memory 110 may, for example, comprise a plurality of dynamic random access memory (DRAM) devices. Synchronous DRAM (SDRAM) may be suitable, as may RAMBUS DRAM (RDRAM), extended data out DRAM (EDO DRAM), or any other type of DRAM. In order to provide more rapid access to recently accessed system memory locations, an optional cache 108 may be employed. Cache 108 may comprise a plurality of static random access memory (SRAM). The address tags identifying which locations are stored in the SRAM may be within bus bridge 106 for rapid access by bus bridge 106. If a hit in cache 108 is detected, the data may be transferred therefrom to CPU 102. Otherwise, the requested data is transferred from system memory 110.

CPU 102 may additionally communicate with a variety of peripheral devices via CPU bus 104, bus bridge 106, and peripheral bus 112. Peripheral bus 112 is suitable for connection to a variety of peripheral devices. Exemplary peripheral devices include RT peripheral 114, as well as other peripherals such as printers, modems, hard and/or floppy disk drive controllers, etc. A suitable peripheral bus 112 may be the PCI bus, the ISA bus, the EISA bus, etc. It is noted that, in other embodiments, computer system 100 may employ multiple CPU's similar to CPU 102 (e.g. optional CPU 103 shown coupled to CPU bus 104). It is further noted that additional bus bridges may be connected to peripheral bus 112 for communication with other buses.

Figure 2:
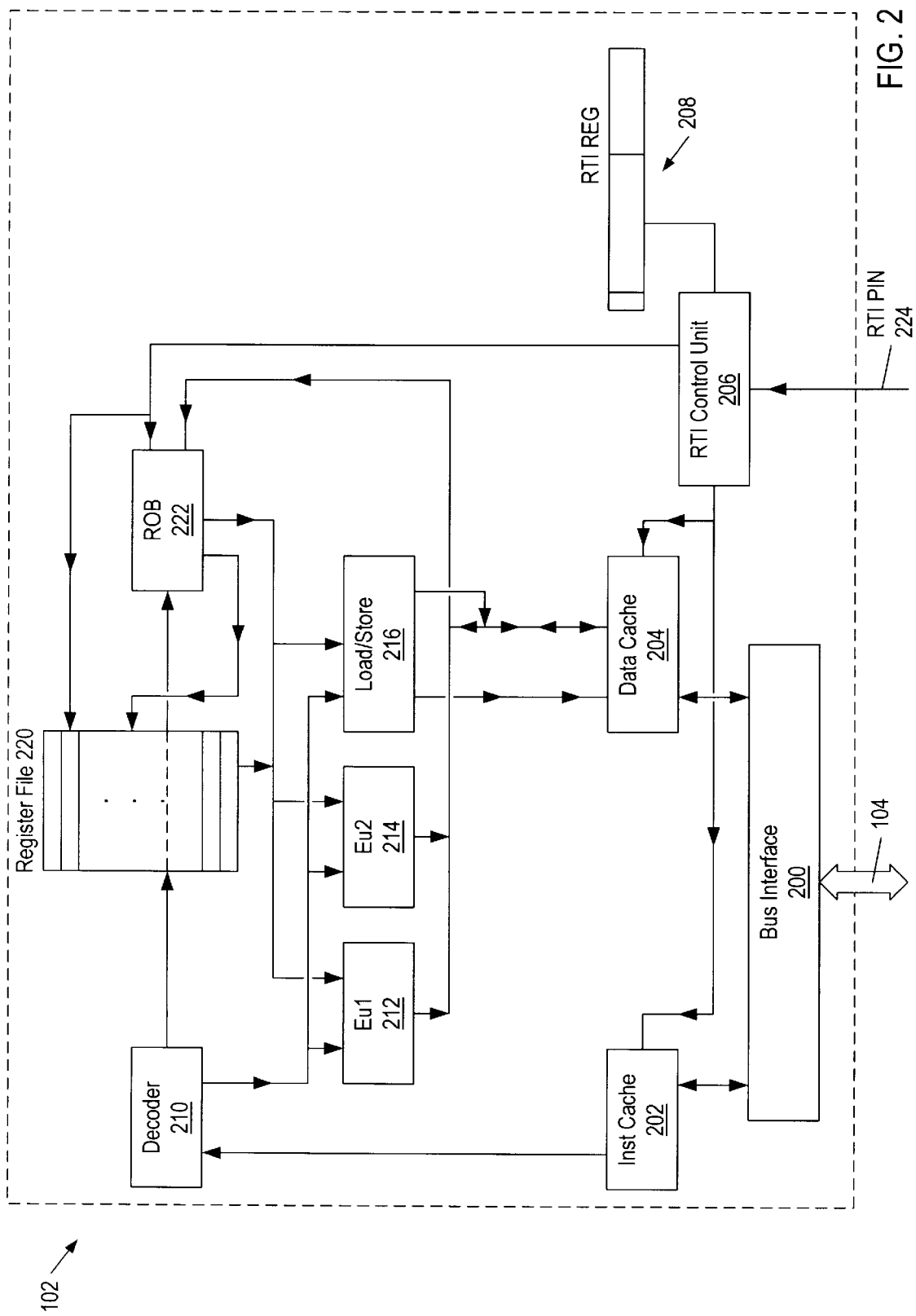
FIG. 2 is a block diagram of one embodiment of a CPU shown in FIG. 1.

Turning now to FIG. 2, a block diagram of one embodiment of CPU 102 is shown. Other embodiments are possible and contemplated. As shown in FIG. 2, CPU 102 includes a bus interface unit 200, an instruction cache 202, a data cache 204, an RTI control unit 206, an RTI register 208, a decoder 210, a first execution unit 212, a second execution unit 214, a load/store unit 216, a register file 220, and a reorder buffer (ROB) 222. Bus interface unit 200 is connected to CPU bus 104 and to instruction cache 202 and data cache 204. Instruction cache 202 is connected to RTI control unit 206 and decoder 210. Decoder 210 is further connected to execution units 212 and 214 and to load/store unit 216. Additionally, decoder 210 is coupled to ROB 222 and register file 220. Register file 220 is connected to ROB 222, execution units 212 and 214, load/store unit 216, and RTI control unit 206. Similarly, ROB 222 is connected to execute units 212 and 214, load/store unit 216, and RTI control unit 206. Load/store unit 216 is connected to data cache 204, which is further connected to RTI control unit 206. RTI control unit 206 is connected to RTI register 208. RTI control unit 206 is further coupled to RTI line 116 via RTI pin 224.

In the present disclosure, an embodiment of CPU 102 employing the x86 architecture is described. However, CPU 102 may employ any suitable architecture as desired. In the x86 architecture, the interrupt vector received during the interrupt acknowledge bus transactions is used to index into an interrupt descriptor table, from which an interrupt descriptor is read. The interrupt descriptor may include a segment selector which identifies a segment descriptor including the base address and other attributes of the segment including the interrupt service routine. Additionally, the interrupt descriptor may include an offset within the segment of the first instruction in the interrupt service routine.

Generally speaking, RTI control unit 206 is configured to control real time interrupt capabilities of CPU 102. More particularly, upon receipt of a real time interrupt signal via RTI pin 224, RTI control unit 206 communicates with ROB 222 to interrupt the currently executing instructions at an instruction boundary in order to execute the interrupt service routine. Preferably, the real time interrupt operates similar to the system management interrupt (SMI). Preferably, the real time interrupt is the highest priority interrupt within CPU 102. Instead of using the interrupt acknowledge cycles normally used to locate an interrupt vector, and then using the interrupt vector to locate an interrupt descriptor, the interrupt descriptor is stored in RTI register 208.

Advantageously, the interrupt descriptor is immediately available to RTI control unit 206. RTI control unit 206 may thereby rapidly determine the fetch address for the RTI service routine. Interrupt latency for real time interrupts may thereby be reduced. RTI control unit 206 may generate the fetch address and convey the fetch address to instruction cache 202.

Additionally, CPU 102 is configured not to save processor context upon initiation of a real time interrupt. Instead, as register resources are needed by the real time service routine, these resources are allocated from register file 220. Registers allocated for real time use are indicated in RTI register 208 as well. In this manner, the latency associated with the context save may be avoided. The allocated registers may be explicitly allocated as needed (causing the contents thereof to be saved, if desired) and deallocated (or released) when the register is no longer needed by the RTI service routine.

Still further CPU 102 is configured with lockable cache lines in instruction cache 202 and data cache 204. An RTI bit is defined in the code and data segment descriptors for indicating whether or not the code/data within the segment is real time code/data (i.e. is used in an RTI service routine). The code/data within these segments is locked into instruction cache 202 and data cache 204. The term locking, when used herein with respect to instruction cache 202 and data cache 204, refers to preferentially storing the instructions/data being locked into the cache. The cache replacement algorithm employed by the cache attempts to select a non-locked cache line for storing a cache line being transferred into the cache. A locked cache line (storing real time code/data) may be selected if another locked cache line is being loaded, or if each selectable cache line is locked and the cache line being loaded is not a locked cache line (not storing real time code/data). Accordingly, real time code and/or data may be loaded into the caches prior to execution of any RTI service routines, and the code/data may be found therein when the RTI service routine is invoked. Advantageously, real time code/data may be available in the lowest latency memory, further decreasing the latency of RTI service routines. RTI control unit 206 communicates with instruction cache 202 and data cache 204 to accomplish the locking of cache lines.

Bus interface unit 200 performs bus transactions upon CPU bus 104 in order to transfer instructions and data to instruction cache 202 and data cache 204, respectively, from system memory 110. Additionally, bus transactions may be performed to transfer update data from data cache 204 to system memory 110, as well as to perform I/O transactions to communicate with peripherals attached to peripheral bus 112.

Instruction cache 202 is a high speed (i.e. low latency) memory used for storing instructions for execution by CPU 102. Instruction cache 202 may employ any suitable configuration, including a set associative or direct mapped configuration. Similarly, data cache 204 is a high speed memory used for storing data to be operated upon by CPU 102. Data cache 204 may employ any suitable configuration, including a set associative or direct mapped configuration.

Instructions are fetched from instruction cache 202 and conveyed to a decoder 210. Decoder 210 decodes the instruction to determine which execution unit 212 or 214, or load/store unit 216, is to execute the instruction. A combination of units may be used (e.g. load/store unit 216 to fetch and store a memory operand, and an execution unit 212 or 214 to perform the instruction operation defined by the opcode). Execution units 212 and 214 collectively include circuitry for executing each instruction within the instruction set employed by CPU 102, or a microcode unit may be include for parsing instructions not directly executable by the circuitry included in execution units 212 and 214 into instructions which are directly executable.

Execution units 212 and 214 may be symmetrical execution units configured to execute the same subset of the instruction set employed by CPU 102. Alternatively, execution units 212 and 214 may be asymmetrical execution units configured to execute different subsets of the instruction set. Execution units 212 and 214 may include one or more reservation stations for storing instructions awaiting operand values.

Load/store unit 216 is configured to communicate memory operations to data cache 204 in response to instructions being executed by CPU 102. Load/store unit 216 may receive address operands and generate the address for the memory operations, or execution units 212 and 214 (or dedicated address generation units therein or associated therewith) may be used to generate the address and load/store unit 216 may be responsible for memory dependency checking and ordering as well as interfacing with data cache 204.

Execution units 212 and 214 and data cache 204 (for load memory operations) forward the results of executing instructions to ROB 222. ROB 222 provides temporary storage for speculative execution results until the instructions are retired. Upon retiring the instructions (in the original program order), the results are stored into the destination register of the instruction. If the destination is a memory operand, a store memory operation is performed by load/store unit 216 instead of storing the value in the destination register.

As instructions are decoded by decoder 210, information regarding the instructions is conveyed to ROB 222 for storage. The destination register is stored, as well as any other instruction information which may be desirable. Additionally, source registers are identified by decoder 210 and conveyed to ROB 222 for dependency checking. If ROB 222 is storing the source register as the destination of a previous instruction, ROB 222 forwards the speculative result corresponding to the previous instruction. If the previous instruction has not yet been executed, a tag identifying the instruction is conveyed. The tag may be detected when the previous instruction is executed and forwards results to ROB 222, and the result captured for use as a source operation of the instruction. Finally, if no previous instruction within ROB 222 includes the source register as a destination, the value from register file 220 is forwarded.

Figure 3:
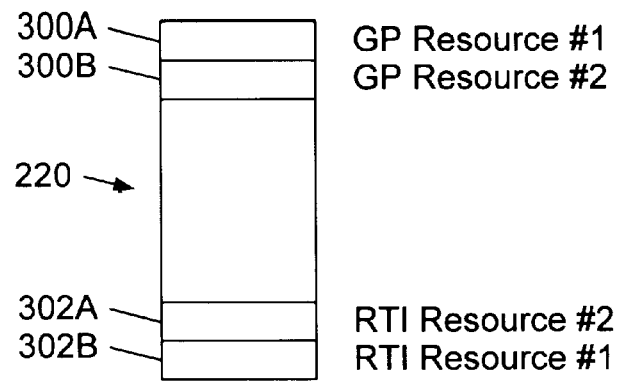
FIG. 3 is a block diagram of one embodiment of a register file shown in FIG. 2.

Turning now to FIG. 3, a block diagram of one embodiment of register file 220 is shown. Other embodiments are possible and contemplated. As shown in FIG. 3, register file 220 includes a plurality of registers. Certain registers (e.g. registers 300A and 300B) are allocated as general purposes resources usable by any instructions. Other registers (e.g. registers 302A and 302B) are allocated as RTI resources usable by instructions within an RTI service routine. As mentioned above, RTI resources within register file 220 may be allocated using RTI register 208 and a predetermined allocation/release protocol employed by software.

Register file 220 may provide more register locations than the architected registers defined by the instruction set architecture employed by CPU 102. The architected registers may be employed as the general purpose resources, and additional registers beyond the architected registers may be employed as the RTI resources, or may be used for register renaming purposes if not allocated as RTI resources.

Figure 4:
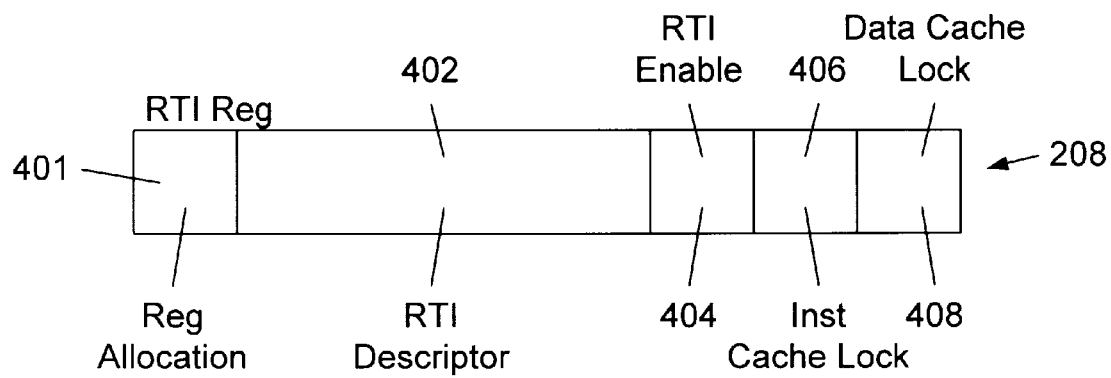
FIG. 4 is a block diagram of one embodiment of a real time interrupt register shown in FIG. 2.

Turning now to FIG. 4, a block diagram of one embodiment of RTI register 208 is shown. Other embodiments are possible and contemplated. As shown in FIG. 4, RTI register 208 includes a register allocation field 401, an RTI descriptor field 402, an RTI enable field 404, an instruction cache lock enable field 406, and a data cache lock enable field 408. It is noted that RTI register 208 may be implemented as multiple registers, as desired. Each register may be independently addressed for reading and update by an instruction. Preferably, RTI register 208 may be implemented as one or more model specific registers (MSRs).

Register allocation field 401 is used to indicate which registers within register file 220 are allocated as RTI resources. The predetermined protocol for allocating and releasing register resources may thereby comprise updating register allocation field 401. Register allocation field 401 may comprise a bit corresponding to each register allocable as an RTI resource. If the bit is set, the register is allocated as an RTI resource. If the bit is clear, the register is not allocated as an RTI resource. In another embodiment, register allocation field 401 may comprise a register number (or address). Each register having a register number larger than or equal to the register number stored in register allocation field 401 may be allocated as an RTI resource, and remaining registers may not be allocated as an RTI resource. Any suitable encoding may be used within register allocation field 401.

RTI descriptor field 402 stores an interrupt descriptor for use with RTI interrupts. The interrupt descriptor may include a segment selector and an offset within the selected segment at which the RTI service routine begins.

RTI enable field 404 stores an enable for RTI control unit 206. If the enable indicates disabled, RTI control unit 206 is idle. Real time interrupts may be serviced using the typical interrupt service mechanism (including using the standard interrupt pin used for other external interrupts and interrupt acknowledge bus transactions, etc.). If the enable indicates enabled, RTI control unit 206 operates as described above. In other words, RTI pin 224 is enabled using RTI enable field 404. RTI enable field 404 may, for example, store a bit indicative, when set, of enablement and, when clear, of disablement.

Instruction cache lock enable field 406 indicates whether or not locking of instruction cache lines containing RTI service routine code into instruction cache 202 is enabled. Similarly, data cache lock enable field 408 indicates whether or not locking of data cache lines containing RTI data into data cache 204 is enabled. Each of fields 406 and 408 may comprise a bit similar to RTI enable field 404 above.

Figure 5:
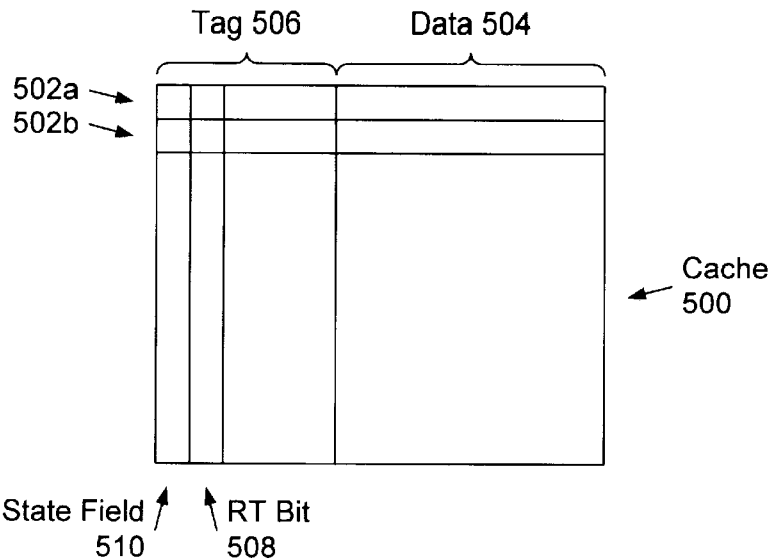
FIG. 5 is a block diagram of one embodiment of a cache shown in FIG. 2.

Turning next to FIG. 5, a block diagram of one embodiment of a cache 500 is shown. Other embodiments are possible and contemplated. Cache 500 may be arranged, for example, as a set associative or a direct mapped cache. Cache 500 may be used as instruction cache 202 and/or data cache 204, in various embodiments.

Cache 500 is configured to store a plurality of cache lines (e.g. storage locations 502A and 502B are each configured to store a cache line). Each cache line storage location 502 includes a data field 504 and a tag field 506. Data field 504 stores the bytes corresponding to the cache line (instruction or data). Tag field 506 stores an address tag identifying the system memory storage locations corresponding to the cache line, as well as a state field 510 and an RT bit 508. State field 510 identifies the state of the cache line. For instruction cache 202, state field 510 may comprise a bit indicating validity/invalidity of the cache line. For data cache 204, state field 510 may comprise an encoding according to, e.g. the MESI (modified exclusive shared invalid) cache coherency encodings.

Figure 6:
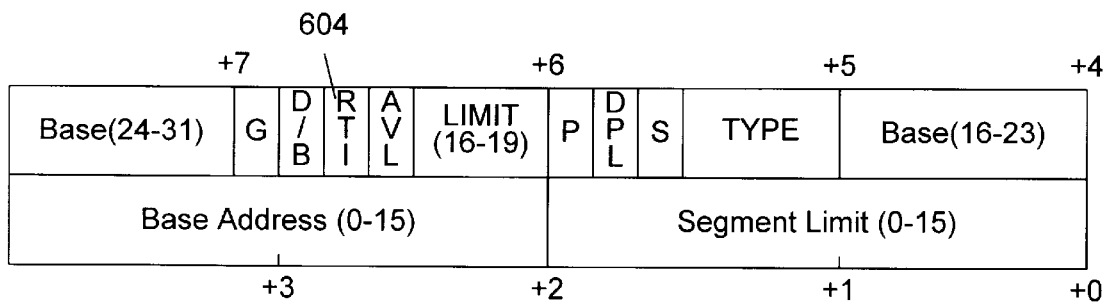
FIG. 6 is a block diagram of one embodiment of a segment table entry according to one embodiment of the CPU shown in FIG. 2.

RT bit 508 is set if the code/data is fetched from an RTI segment (identified via an RTI bit in the segment descriptor, as shown in FIG. 6, according to one embodiment). If RT bit 508 is set, the cache line is considered locked in the cache. When a missing cache line is being fetched into cache 500, cache 500 attempts to use a cache line storage location which is not locked to store the missing cache line. Locked cache lines may be overwritten by other locked cache lines or if all selectable cache lines are locked, but are otherwise maintained within cache 500.

Turning next to FIG. 6, a block diagram illustrating one embodiment of a segment descriptor is shown. Other embodiments are possible and contemplated. As shown in FIG. 6, the segment descriptor includes the base address, segment limit, G, D/B, AVL, P, DPL, S, and type fields defined by the x86 architecture. Additionally, an RTI bit 604 is included to indicate if code and/or data within the segment is real time interrupt code and/or data. The RTI bit can be used to indicate whether or not a cache line is to be locked into the corresponding cache (assuming the corresponding lock enable field indicates that locking is enabled).

Numerous variations and modifications will become apparent to those skilled in the art once the above disclosure is fully appreciated. It is intended that the following claims be interpreted to embrace all such variations and modifications.

What is claimed is:

1. In a computing system, a microprocessor comprising:
    a real time interrupt (RTI) control unit configured to detect an RTI signal and wherein said RTI control unit is further configured to cause the microprocessor to suspend execution of a currently executing task and to execute an RTI service routine in response to detecting said RTI signal; and
    a register file comprising a plurality of registers, wherein said microprocessor is adapted to allocate at least one of said plurality of registers as a real time register, wherein said real time register is available only to said real time service routine, and wherein said microprocessor is further configured to release said real time register, wherein said released register is accessible by all applications executing on said computing system.

2. The microprocessor of claim 1 further comprising an RTI register wherein said RTI register includes a selector field indicative of an address of an RTI service routine, and wherein said selector field of said RTI register includes an offset value and an index value, wherein said index value points to a memory segment descriptor within a descriptor table, and wherein said descriptor includes a memory segment base address, and further wherein said RTI service routine is located at an RTI service routine address calculated by adding said offset value to said base value.

3. The microprocessor of claim 2, wherein said descriptor includes an RTI bit wherein said RTI bit is indicative of whether a memory segment described by said descriptor is an RTI segment.

4. In a computing system, a microprocessor comprising:
    a real time interrupt (RTI) control unit configured to detect an RTI signal and wherein said RTI control unit is further configured to cause the microprocessor to suspend execution of a currently executing task and to execute an RTI service routine in response to detecting said RTI signal; and at least one internal cache comprising a plurality of cache lines, wherein each said cache line includes tag information indicative of an originating or destination location within a main memory of said computing system, and wherein said tag information includes an RTI field indicative of whether information in a corresponding cache line originated from said RTI service routine;

wherein said microprocessor is configured to use said RTI field of said tag information to prioritize retention of cache lines originating from said RTI service routine over retention of cache lines not originating from said RTI service routine even if said RTI service routine is not being executed.

5. The microprocessor of claim 4, wherein said microprocessor is configured to replace cache lines originating from said RTI service routine if the replacing cache line also originated from an RTI service routine.

6. The microprocessor of claim 4, further comprising an RTI register wherein said RTI register further includes at least one cache lock bit, wherein said cache lock bit is indicative of whether said microprocessor is to prioritize retention of RTI service routine code in an internal cache memory of said microprocessor.

7. The microprocessor of claim 1 further comprising a dedicated real time interrupt (RTI) pin and an RTI register, wherein said RTI register includes an RTI enable bit indicative of whether said microprocessor is enabled to accept RTI signals on said RTI pin.

8. A method of handling interrupts in a computing system including a microprocessor, said method comprising:

initiating a real time interrupt (RTI);

suspending execution of a currently executing task and initiating execution of an RTI service routine;

prior to said suspending said execution, allocating at least one register of a register file comprising a plurality of registers as an RTI resource register wherein said RTI resource register is accessible only by said RTI service routine; and subsequent to said allocating, releasing said RTI resource register wherein said released register is accessible to all applications executing on said computing system.

9. The method of claim 8, wherein said RTI is initiated by a real time peripheral connected to a bus bridge of said computing system, wherein said bus bridge is coupled device to said microprocessor.

10. A method of handling interrupts in a computing system including a microprocessor, said method comprising:

initiating a real time interrupt (RTI);

suspending execution of a currently executing task and initiating execution of an RTI service routine;

storing a portion of said RTI service routine in a line of an internal cache of said computing system and setting an RTI bit within tag information corresponding to said cache line; and prioritizing retention of cache lines containing portions of said RTI service routine over retention of remaining cache lines even if said RTI service routine is not being executed.

11. The method of claim 10, further comprising setting a cache lock bit in an RTI register to enable prioritization of cache lines in said internal cache depending upon the state of said RTI bit within tag information corresponding to said cache lines.

* * * * *